United States Patent

[11] 3,601,954

[72] Inventor Theodore F. Aronson
 Glen Cove, N.Y.
[21] Appl. No. 776,128
[22] Filed Nov. 15, 1968
[45] Patented Aug. 31, 1971
[73] Assignee Eli Lilly and Company
 Indianapolis, Ind.

[54] APPARATUS FOR CONVEYING AND FILLING CAPSULES
 21 Claims, 12 Drawing Figs.
[52] U.S. Cl. ............................................. 53/282,
 198/131
[51] Int. Cl. ......................................... B65b 1/00,
 B65b 7/28
[50] Field of Search............................. 53/281,
 282; 198/131, 145, 148; 29/200 A, 208 B

[56] References Cited
UNITED STATES PATENTS
2,764,863 10/1956 Kath....................... 53/282

Primary Examiner—Theron E. Condon
Assistant Examiner—Robert L. Spruill
Attorney—Irving Seidman ABSTRACT: This disclosure is directed to an apparatus for conveying and handling a capsule of the type having a cap portion and body portion interfitted to one another. The apparatus comprises essentially of a conveyor preferably in the form of an endless flexible chain having connected thereto relatively movable complementary capsule holding means which are adapted to move into and out of alignment as the conveyor is moved in a predetermined path to effect sequentially the feeding, separation, filling, reassembly and finally ejection of the filled capsule therefrom. Thereafter the arrangement is such that the respective complementary capsule holding portions can be individually purged; and the cycle of operation repeated.

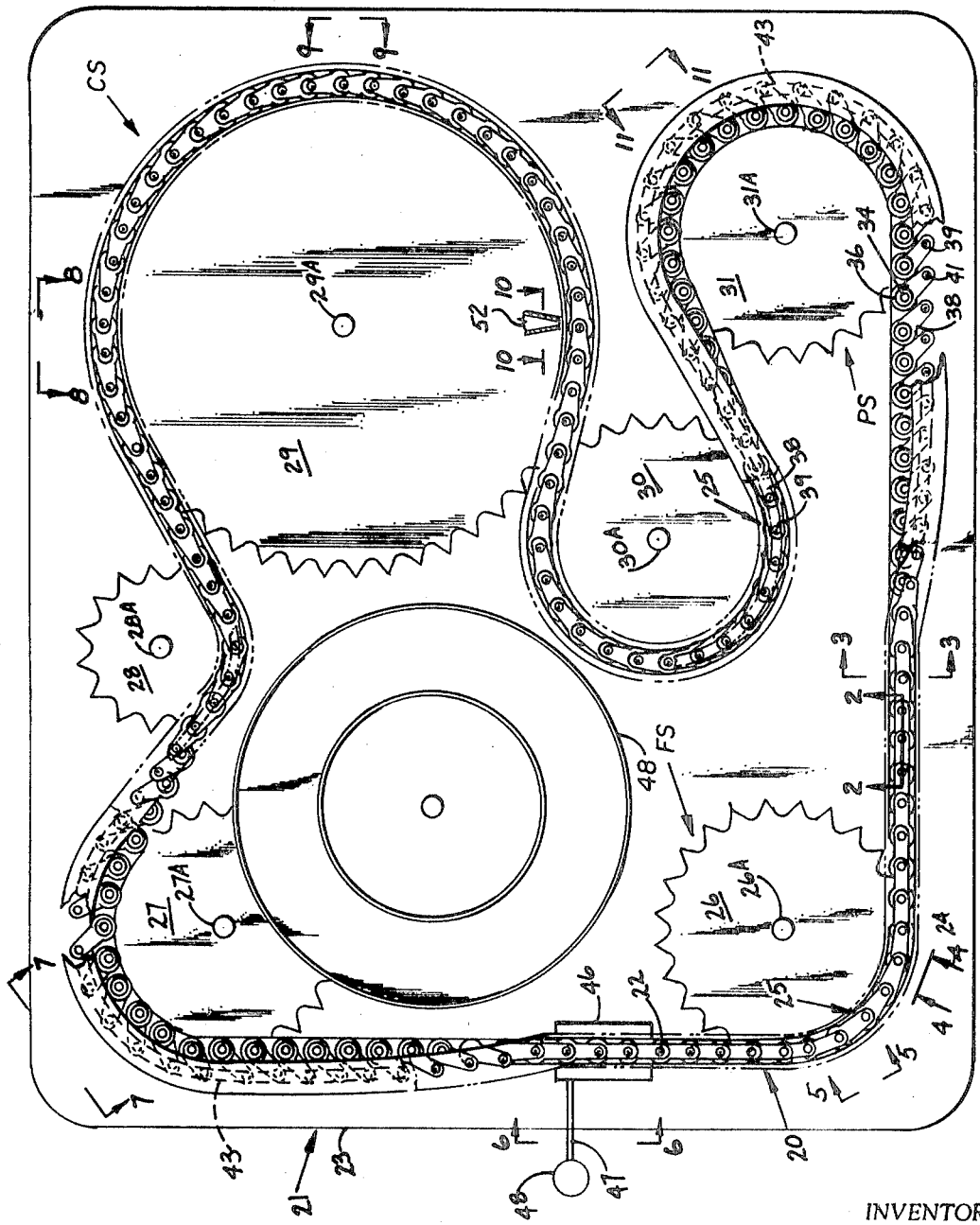
FIG. I
INVENTOR.
THEODORE F. ARONSON
BY
Irving Seidman
ATTORNEY.

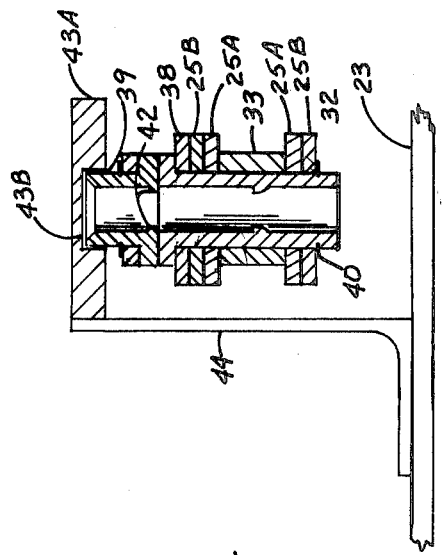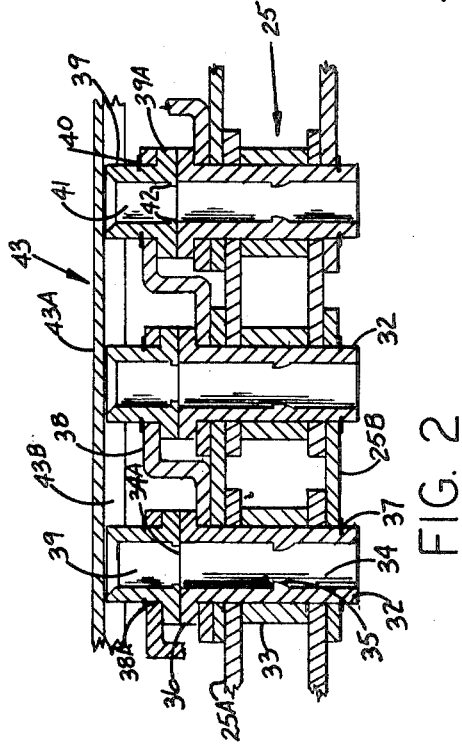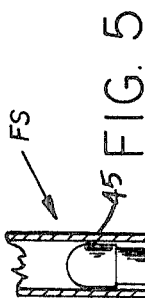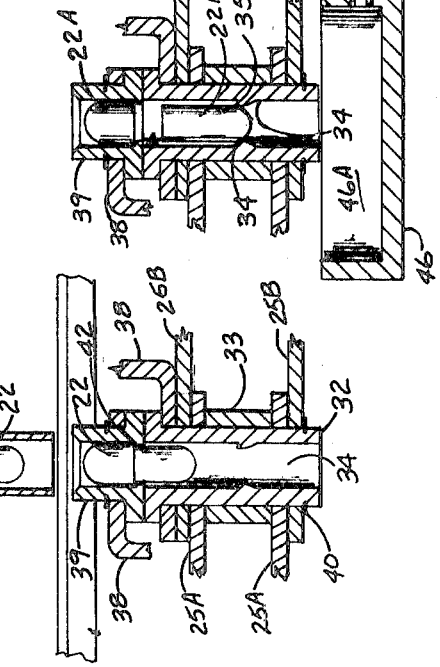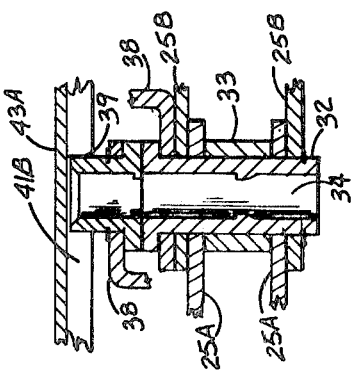

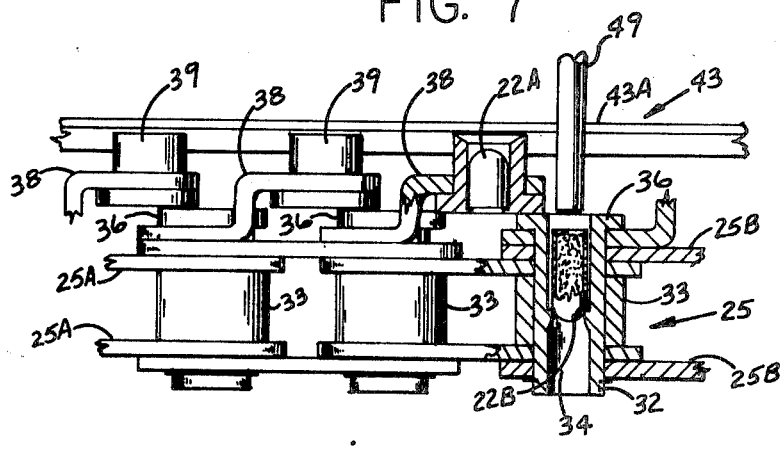

APPARATUS FOR CONVEYING AND FILLING CAPSULES

PROBLEM IN THE ART

Heretofore considerable difficulty was encountered in the art of handling and filling capsules of the type having interfitted cap and body portions during a filling operation. Generally the capsules had been fed at a feed station as an assembled and emptied unit onto a conveyor. As the conveyor advanced the capsules toward the filling station it was required that the emptied capsule be operated upon to effect the separation of the body portion form the cap portion so that the former may be filled with a suitable material. Separation of the capsule was performed either manually or automatically by a relatively complicated mechanism having intricately moving fingers. The removed capsule portion was then carried on the conveyor in a semiloosened manner adjacent its mating body portion as the latter was conveyed through a filling station.

Experience has evidenced that such procedure was unsatisfactory because the vibration and/or movement imparted to the conveyor frequently resulted in the cap portion being loosened or shaken free of the conveyor. When this occurred the dislodged capsule portion would invariably jam the operating mechanism of the apparatus.

Reassembly of the respective capsule portion upon the filling thereof was again required to be either manually performed, or automatically performed by relatively complicated mechanism similar to that needed to automatically effect removal of the cap portion from the body portion of the capsule; but programmed to operate in the reverse order. Consequently such operations when performed manually resulted in a tedious, time-consuming operation which is inconsistent with an automatic line. When performed automatically the equipment necessary was complicated, costly and generally unsatisfactory.

OBJECTS

An object of this invention is to provide a conveyor having a plurality of capsule receiving means spaced along the conveyor in which the capsule receiving means includes complementary relatively movable first and second portions which are adapted to be moved into and out of alignment in a predetermined sequence as the conveyor is moved along a predetermined path through a series of successive operating stations.

Another object is to provide a relatively simple and inexpensive means for conveying a capsule through a plurality of operating stations in a manner wherein the respective capsule portions are positively held in place throughout the operating cycle.

Another object is to provide a relatively simple capsule handling and conveying means in which the capsule portions can be readily separated, filled, reassembled and ejected in a relatively simple, continuous, expedient and positive manner.

BRIEF SUMMARY OF THE INVENTION

The foregoing objects, features and other advantages are attained by an apparatus in which a plurality of capsules are successively conveyed through a series of operating stations in a manner in which the respective capsule portions are positively held in place throughout the entire operating cycle of feeding, separating, filling, reassembly and ejection of the capsule. The apparatus comprises an endless flexible conveyor means having connected thereto a plurality of relatively movable complementary capsule holders. Preferably of connected chain links in which the adjacent links are pivotally secured by a sleeve pin having a bore extending therethrough for accommodating the body portion of a capsule. Pivotally connected to the chain are a series of arms which have connected to the free end thereof a complementary capsule holder. The arrangement is such that the complementary capsule holder pivots into and out of alignment with the bore of the next adjacent sleeve pin, and a means is provided for effecting relative movement of the complementary capsule holder into and out of alignment relative to its corresponding sleeve pin in a predetermined sequence.

In operation the respective complementary capsule holders are disposed in alignment as the conveyor chain passes through a station in which assembled capsules are successively fed into each such aligned capsule holder. The movable complementary capsule holder is formed so that the cap portion of the capsule received therein is retained as the body portion of the capsule extends into the bore of the corresponding aligned sleeve pin of the chain.

The respective aligned portions of the succeeding capsule receivers are directed over a zone of reduced pressure to subject the body portion of the capsule to a negative pressure which causes it to be pulled or separated from the retained cap portion in the upper capsule holder portion. Upon separation, the body portion of the capsule is sealed within the sleeve pin and the upper capsule holder in which the cap portion is retained is pivoted into and out of alignment position so as to expose the open end of the body portion of the capsule retained in the sleeve pin as the conveyor is moved through the filling station. As the respective capsule holder carrying the body of the capsules carried therein are successively filled.

Upon passing through the filling station the complementary capsule holder retaining the cap portion of the capsule is again moved into alignment with the sleeve pin containing the filled capsule body portion whereupon a cooperatively associated cam actuated pin or ejector is actuated to bear on the aligned capsule portions within the respective complementary capsule holder to effect reassembly and ejection of the filled capsule accordingly.

Upon ejection of the capsule, the respective capsule holders are again moved to a misaligned position at which time the respective capsule holders are operated upon by cam actuated ejectors to purge the respective capsule holders of any defective capsule portions which may become jammed or stuck therein. Thereafter the cycle is repeated as the conveyor moves in an endless path.

A feature of this invention resides in the provision of a single conveyor having relatively movable capsule holding portions carried thereon for transporting the respective capsule portions through a series of operating stations in which the respective movable capsule holding portions are moved into and out of alignment in a predetermined order so as to effect feeding, separation, filling and ejection in an expedient, simple and positive manner.

Another feature of this invention resides in the provision of an endless flexible conveyor having a capsule holder connected thereto adapted for receiving a body portion of a capsule and a complementary hingedly connected cap holding portion adapted to swing into and out of alignment with the respective body holder capsule portion carried by the conveyor.

Another feature of this invention resides in the provision wherein separation of the capsule is effected in situs within the capsule holding means carried by the conveyor by subjecting the capsule to a force of negative pressure.

Another feature of this invention resides in the provision of a relatively simple and inexpensive conveyor wherein a plurality of capsules are continuously conveyed in a relatively rapid and uninterrupted manner through a plurality of successive operating stations to effect the operations of feeding, separations, filling, reassembly, ejection and purging.

Other features and advantages will become more readily apparent when considered in view of the drawings and specifications in which:

FIG. 1 is a plan layout of a capsule conveyor illustrating an embodiment of the invention.

FIG. 2 is an enlarged sectional view taken along line 2—2 on FIG. 1.

FIG. 3 is a sectional end view taken along line 3—3 on FIG. 1 illustrating the support of the cam track.

FIG. 4 is a detailed side sectional view taken along line 4—4 on FIG. 1.

FIG. 5 is a detailed side sectional view taken along line 5—5 on FIG. 1.

FIG. 6 is a detailed side sectional view taken along line 6—6 on FIG. 1.

FIG. 7 is a detailed side sectional view taken along line 7—7 on FIG. 1.

FIG. 8 is a detailed side sectional view taken along line 8—8 on FIG. 1.

FIG. 9 is a detailed sectional view taken along line 9—9 on FIG. 1.

Figure 11:
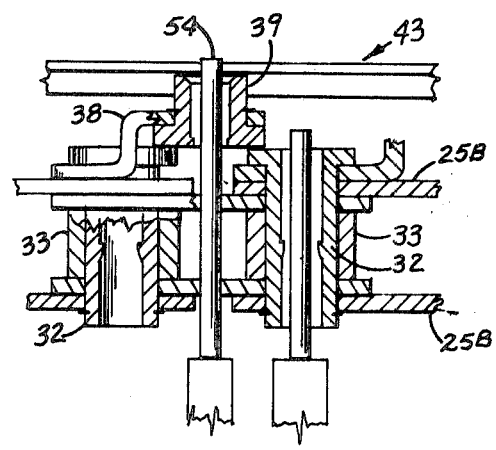
FIG. 11 is a sectional view taken along line 11—11 on FIG. 1.
Figure 12:
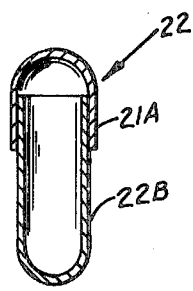
FIG. 12 is a detailed sectional view of a type capsule.

Referring to the drawings, FIG. 1 illustrates a plan view of the conveyor portion 20 of a capsule filling apparatus 21 by which a predetermined amount of powdered material or other article of manufacture is placed within a capsule 22. Capsules 22 of the type on which the illustrated apparatus 21 is intended to operate comprises a cap portion 22A and a complementary body portion 22B interfitted in the assembled position. See FIG. 11. The respective capsule portions 22A, 22B may be semispherical or semielliptical in shape. In the illustrated form a generally elliptical-shaped capsule 22 is shown. Such capsules 22 when used as a pill to encase therein a predetermined amount of medicinal powder are generally made of a digestible material. However capsules of the type described may be formed of any suitable material, e.g. glass, plastic, metal or the like and may also be used to package other articles of manufacturers or commerce e.g. toys, novelties of various sorts, etc.

The illustrated form of the apparatus is directed to an arrangement whereby capsules 22 may be readily filled with a predetermined amount of powdered material in a substantially continuous or uninterrupted manner. The filling apparatus 21 comprises generally of a supporting surface or frame 23 on which the component parts or operating stations are supported.

The illustrated apparatus 21 is directed to a device by which a plurality of capsules 2, are successively conveyed through a series of operating stations in which an emptied capsule is first fed onto the conveyor, separated, then filled with a desired article of manufacture, and thereafter reassembled to confine the article of manufacture therein. The filled and reassembled capsule is then ejected permitting the cycle of operation to be continuously repeated.

The means by which the respective capsules are conveyed from station to station comprises a conveyor 24 carrying a series of complementary capsule holding means 25. The conveyor means 24 is illustrated as an endless flexible conveyor in the form of a chain which is guided in a predetermined path about a plurality of guide means in the form of spaced toothed sprockets 26, 27, 28, 29, 30, and 31.

As shown the illustrated conveyor chain comprises a series of chain links 25A, 25B, of spaced link plates which are pivotally secured at their adjacent ends by a hollow pin or sleeve 32. The respective pins or sleeves 26, securing the adjacent ends of links 25A, 25B, are fitted with a bearing sleeve 33 which also defines a spacer between the opposed link plates of the respective chain links 25A, 25B.

As best seen in FIG. 2, the sleeve pin 32 is provided with a bore 34 extending therethrough. Intermediate the length of the bore 34 there is provided an internal shoulder 35 to define a seat or support for the body portion 22B of a capsule 22 adapted to be received therein. The length of the bore 34 between the shoulder 35 and the upper end 34A is dimensioned slightly greater than the length of the body portion of the capsule 22. The respective sleeve pins are illustrated as being held in position by a flange 36 on one end thereon and by a retaining ring 37 for securing the other end thereof.

Pivotally connected about the upper end of the respective sleeve pins 34 is an arm 38. One end of the arm is offset, the offset end being provided with an opening 38A for receiving a bushing or collar 39 which defines a complementary capsule holder to accommodate the cap portion 22A of the capsule. The bushing collar 39 is retained to arm 38 by a bottom flange 39A formed on the collar 39 and a retaining ring 40.

As shown the bushing or collar 39 is provided with a bore 41 extending therethrough and it is provided with an internal shoulder 42. The internal shoulder 42 is proportioned so as to support or form a sect for the cap portion 22A of a capsule adapted to be received therein which the internal diameter of the shoulder 42 is sized to permit the body portion of the capsule to extend therethrough. See FIG. 5.

In operation the arm 38 and the connected bushing 39, which defines the cap holder portion of the respective capsule receiving means 25, is arranged to pivot about its respective pivot into and out of alignment with the next adjacent or succeeding sleeve pin 34 in a predetermined sequence.

In the illustrated embodiment the pivoting sequence of the arm 38 and connected cap holder 39 is controlled by a cam track 43. The cam track may comprise a channel member 43A having formed in the undersurface thereof a cam groove 43B adapted to receive the respective cap holder or bushing 39. The cam groove 43B of the cam track 43 is thus formed so that portions thereof are disposed in alignment with the travel path of the sleeve pins 32 with other portions of the cam groove 43B disposed out of alignment with the travel path of the cam groove 43B. Brackets 44 spaced along the cam track 43 support and maintain the track 43 in position on the support 23.

Referring to FIG. 1 the conveyor chain 24 is guided in an endless path about a series of spaced toothed sprockets 26 to 31, each journaled to its respective shaft or pivot 26A, 27A, 28A, 29A, 30A and 31A. The teeth of the respective sprockets are formed with a root diameter sized to complement the diameter of the bearing or spacer 33 circumscribing the sleeve pin.

Cooperatively associated with sprocket 26 is a rectifier turret (not shown) which defines a capsule feed station FS. The capsule feed station includes a conventional capsule feed hopper for containing a supply of capsules 22 together with means for feeding the assembled but emptied capsules successively to the respective capsule holder means 25 carried on the conveyor chain. The capsule feed means comprises conventional structure, specific details of which are not necessary for an understanding of the present invention. Such capsule feed means operate to successively orient and feed the capsules to a feed tube 45 whereby the capsules therein may be successively fed into the capsule holding means on the moving conveyor. As best seen in FIG. 1, the pivotal cap holder portion 38 is moved by the cam groove 43B into alignment with its corresponding sleeve pin 32 as the conveyor rounds sprocket 26 which is synchronized to the operation of the capsule feed station or rectifier.

As best seen in FIG. 5, the respective capsules are fed body first into the successive moving aligned capsule holding means 25 passing beneath the feed tube 45 of the rectifier or feed station FS. As the capsule 22 is received in the respective aligned capsule holder 25, the cap portion 22A becomes seated on the inturned flange or shoulder 42 of the cap bushing or holder 39 as the body portion 22A of the capsule extends through the opening defined thereby and into the bore 34 of the associated sleeve pin 32. In this position, as noted in FIG. 5 the body portion 22B of the capsule is spaced above the flange or seat 35 of the sleeve pin.

Spaced downstreamwise in the direction of the chain travel from the feed station, there is located a vacuum chamber 46 having a slotted opening 46A disposed contiguous to the bottom opening of the sleeve pins 32 which are arranged to pass thereover. The arrangement is such that the bore 34 of the respective pins 32 are placed in communication with the vacuum chamber 46 as the conveyor passes thereover. The vacuum chamber 46 in turn is connected to a source of negative pressure e.g. a vacuum pump 47 by a suitable conduit 48. Thus as the chain conveyor 20 passes over the slotted opening 46A of the vacuum chamber, the bore of the sleeve pins 32 and the capsule carried therein is subjected to the force of negative pressure occasioned thereby, causing the body portion 22B of the capsule to be pulled away from the cap portion 22A retained by the shoulder 42 in bushing 39. In doing so, the capsule body becomes separated and seated on the internal shoulder 35 of the associated sleeve pin 32. See FIG. 6.

As the conveyor moves beyond the vacuum chamber 46 in the direction of travel, the cam groove 43B of the cam track 43 gradually causes the respective cap holders 39 riding therein to be pivoted out of alignment with respect to its associated sleeve pin 32, containing the separated body portion 22B of the capsule. Thus as the conveyor chain 20 rounds sprocket 27, the open upper end of the body 22B of the capsule is exposed to receive its contents.

A capsule filling station is cooperatively associated with sprocket 27 which is synchronized in movement therewith and it includes a powder hopper for supplying a powder supply to a powder trough 48. An associated pickup means 49 is operatively associated with the fill station apparatus for placing a predetermined amount of material from the powder trough to the body 22B of the capsule. Generally the powder pickup means 49 comprises a gun-type pickup, e.g. of the type disclosed in pending application Ser. No. 738,683 filed June 20, 1968 and now U.S. Pat. No. 3,489,055 "Material Handling Method and Apparatus" and Ser. No. 626,083 filed Mar. 27, 1967 for "Method and Apparatus for Dispensing Equal Amounts of Powder Material" which is operatively connected to a rotating turret synchronized to the operation of the turret sprocket 28. Accordingly as seen in FIG. 7, the pickup 49 is actuated so that a predetermined measure of powder material is disposed in each capsule body moving thereunder. As seen in FIG. 1, the cap holder is maintained out of alignment relative to the sleeve pin 32 and capsule body 22B therein as the conveyor is synchronized to the filling turret sprocket 27.

As the conveyor chain moves beyond the turret filling sprocket 27, the cam track is shaped so as to bring or pivot the cap holder 39 and the capsule 22A therein into axial alignment with its corresponding sleeve pin 32 which now contains a capsule body 22B and its contents. A takeup sprocket 28 may be disposed downstream from turret sprocket 27 to take up any slack in the chain.

With the capsule holder means 32 and 39 returned into axial alignment by the cam track 43, the chain is guided about the capsule reassembly turret sprocket 29. Operatively associated with the capsule reassembly turret sprocket 29 is a closing and ejecting station CS. The closing and ejecting means comprises a series of moving fingers movably mounted on a rotating turret disposed above and below the turret sprocket 27 which are adapted to rotate in synchronization therewith. The fingers are preferably cam actuated so as to extend into and out of the respective aligned capsule holder means 32 and 39. The arrangement is such that the fingers 50 of the upper turret (not shown) are progressively lowered until it bears on the cap 22A of the capsule carried on the associated cap holder 39; as seen in FIG. 8. The lower finger 51 in turn is progressively raised under the influence of its cam to effect upward displacement of the filler body portion 22B of the capsule toward the cap 22A to effect reassembly of the capsule to confine its contents therein. See FIG. 9.

Figure 10:
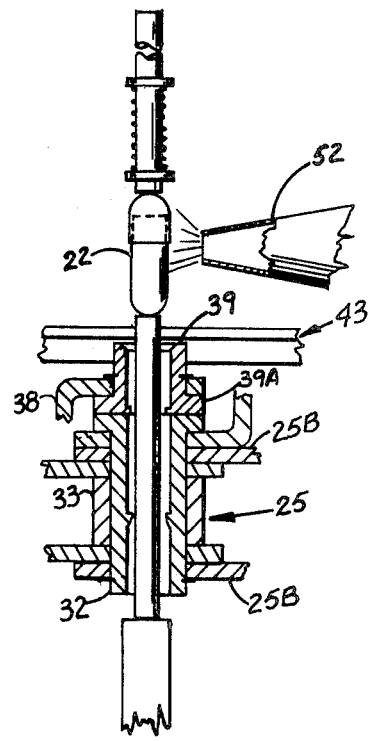
FIG. 10 is a detailed sectional view taken along line 10—10 on FIG 1.

As the conveyor 20 continues to advance about sprocket 29, from approximately position 9—9 to position 10—10, the lower finger 51 is progressively raised under the influence of its actuating cam to a position indicated in FIG. 10 wherein the reassembled capsule is ejected to a position above and free of the aligned capsule holder means 32 and 39. As seen in FIG. 10, the pressure exerted by fingers 30 and 39. As seen in FIG. 10, the pressure exerted by fingers 30 and 51 is sufficient to hold the assembled capsule 22 therebetween.

To remove or release the capsule from between holding fingers 50, 51, a jet of pressurized fluid, as for example, compressed air from a nozzle or jet 52 is directed against the capsule 22. The air jet 52 has sufficient velocity or force to effect dislodgement of the ejected capsule as the conveyor moves past the airstream of jet 52. A suitable collector not shown, receives the ejected capsules.

Upon ejection of the capsules from between the fingers 50, 51, the fingers are retracted to their inoperative position. By rotating the fingers 50, 51 by a suitably turret action driven in synchronization with the turret sprocket 29, and by controlling the reciprocation thereof by suitable cam means, reassembly and ejection of the capsule within and from the capsule holder means 32 and 39 is effected as the conveyor 20 is continuously moving.

As the conveyor rounds the turret sprocket 29, it is brought into meshing relationship with the main driving sprocket 30.

If desired a reaming or purge station PS may be included in the cycle. The purge or reaming station includes a reaming turret sprocket 31 operatively associated with a reaming turret (not shown). As the conveyor approaches the reaming turret sprocket 31, the associated cam track 43 is shaped to again pivot the cap holder means 39 out of alignment relative to its corresponding sleeve pin 32. Associated with the reaming turret sprocket and arranged to rotate in synchronization therewith is a reaming turret with associated reaming fingers 54 which are reciprocated to ream the capsule holder or sleeve 32 of any defective or damaged capsule retained therein. A similar ream action may be performed on the cap holder means 39.

As the conveyor rounds the reaming turret sprockets, the cam track is again shaped to gradually pivot the succeeding cap holder means 39 riding therein into alignment with its corresponding sleeve pin 32 whereby the cycle of operation is repeated.

The conveyor means 20 herein described and the respective complementary capsule holding means 32 and 39 carried thereby greatly simplifies a capsule filling apparatus 21 in that a single conveyor means is afforded in which separation and reassembly of the respective capsule portions 22A, 22B can be readily effected merely by providing a complementary cam track for pivoting the cap holder means 39 relative to its corresponding sleeve pin or body holder 32 in a predetermined sequence which is programmed by the shape of the cam groove 43B.

While the movement of the cap holder 39 has been effected by a specific cam track having an endless cam groove 43B formed therein, it will be understood that other activating means may be provided for effecting the positioning of the cap holder 39 relative to its associated sleeve pin or body holder means 32. If desired the cap holder may be provided with friction lock means for maintaining the same in either the aligned or misaligned position, with segmented cams or other suitable activators for effecting the pivoting of the cap holder relative to its associated body holder means 32. Also instead of a chain link construction, the conveyor may comprise any suitable timing belt with the capsule holding means 32 and 39 suitably supported or mounted to one side thereof.

While the invention has been described with respect to a particular embodiment thereof, it will be readily understood and appreciated that variations and modifications may be made without departing from the spirit or scope of the invention.

What is claimed is:

1. A capsule handling apparatus for conveying a capsule having a body portion and a complementary cap portion through a series of operating stations and comprising:
  a flexible conveyor means,
  means for guiding said conveyor means along a predetermined path,
  a plurality of capsule receiving means spaced along said conveyor means,
  each of said capsule receiving means including a plurality of first portions connected in spaced relationship along said conveyor means, and a plurality of corresponding complementary second portions pivotally connected to said conveyor means whereby each second portion is rendered movable relative to its corresponding first portion, and means for pivoting said complementary second portion into and out of alignment with its respective corresponding first portion in a predetermined sequence, said conveyor means comprising a chain conveyor formed of a plurality of connected links, and a sleeve pin pivotally connecting the adjacent ends of succeeding links, said pin defining said first portion of said capsule receiving means.

2. The invention as defined in claim 1 and including an arm pivotally connected about each of said pins, said arm having an end portion adapted to overlie the next adjacent sleeve pin, a bushing carrier on the end portion of said arm, said bushing defining the second portion of said capsule receiving means.

3. A capsule handling apparatus for conveying a capsule having a body portion and a complementary cap portion through a series of operating stations and comprising:

a single, unitary, flexible, endless conveyor means, means for effecting the drive of said endless conveyor means along a predetermined path, a plurality of capsule receiving means, said capsule receiving means including means defining a first portion spaced along the length of said conveyor means to define a carrier for carrying the body portion of a capsule through said predetermined path, and means defining a second portion, said second portion including a series of arms connected in seriatim along the length of said conveyor means, each of said arms having one end pivotally connected to said conveyor means at spaced intervals therealong and having its other end free for moving laterally relative to said conveyor means for swinging into and out of vertical alignment and misalignment with said flexible endless conveyor, means formed in said free end of each arm defining a carrier for the cap portion of said capsules, said arms swinging in a plane parallel to the plane of the conveyor means so that the axis of the cap portion and body portion of the capsule are maintained normal to the swinging plane of said arms whereby the cap portion carried in the cap carrier in the free end of the arms is moved into and out of vertical alignment with the capsule body portion carried in the body carrying means spaced along said conveyor means, and cam means for successively engaging the free end of each of said arms for guiding said free end of said arms into and out of vertical alignment with said conveyor means as said conveyor means is moved along said path in a predetermined sequence.

4. The invention as defined in claim 3 and including means for effecting separation of said capsule portions adapted to be received in said aligned capsule receiving portions.

5. The invention as defined in claim 3 wherein said second capsule receiving portion includes means for supporting a capsule therein.

6. The invention as defined in claim 4 and including means disposed downstreamwise from said separating means to effect reassembly of said separated capsule portions.

7. The invention as defined in claim 6 and including means disposed between said separating means and said reassembly means for positioning a material in the body portion of said separated capsule.

8. The invention as defined in claim 4 wherein said separating means comprises:

a vacuum chamber adapted to be connected in communication with said first capsule receiving means, and means for subjecting said chamber to a negative pressure for separating the capsule positioned in said capsule receiving means.

9. In a capsule filling machine, the improvement of a means for conveying a capsule having a cap portion and a complementary body portion through the various operating stations including at least a capsule receiving station and capsule filling station comprising:

a flexible conveyor means, said conveyor means including an endless chain conveyor, means for guiding said conveyor means in a predetermined path through the respective operating stations, complementary capsule receiving means carried on said conveyor means, said complementary capsule receiving means including a first portion and a second portion, said first and second portions being connected for relative movement with respect to one another, means for effecting alignment of said first and second portions as said conveyor means passes through a capsule receiving station, means for effecting separation of said capsule adapted to be received within said aligned capsule receiving portions, and means for effecting misalignment of said first and second capsule receiving portions upon the separation of said capsule as said separated capsule is directed through the capsule filling station of said machine for receiving a manufacture therein, said chain conveyor including:

a plurality of connected links, each link including a pair of spaced link plates, each of said pair of link plates having aligned apertures, a sleeve pin extended through said aligned openings for securing the adjacent ends of succeeding link plates, and said sleeve pin defining a capsule receiving portion for accommodating the body portion of the capsule.

10. The invention as defined in claim 9 wherein said second capsule receiving portion comprises an arm pivotally connected to each of said sleeve pins, a bushing carried on the free end of said arm for movement into alignment and misalignment with said sleeve pin, said bushing being defined with an inturned shoulder adjacent one end thereof for retaining the cap portion of the capsule therein.

11. The invention as defined in claim 10 wherein said shoulder defines an opening sized to permit the body portion of the capsule to pass therethrough in the aligned position of said capsule receiving portion.

12. The invention as defined in claim 9 wherein the sleeve pins of said chain is defined with a recess for accommodating the body portion of the capsule, said recess being slightly longer than the length of the body portion of said capsule.

13. The invention as defined in claim 12 including means defining an opening in communication with said recess.

14. The invention as defined in claim 13 wherein said means for effecting separation of said capsule within said capsule receiving means comprises a vacuum chamber positioned adjacent to said capsule receiving station, said vacuum chamber being adapted to be connected in communication with the opening to said recess of said sleeve pin.

15. Conveyor means for effecting the conveyance and separation of connected caps and body portions for a capsule comprising:

an endless chain conveyor including a plurality of chain links, and sleeve pins pivotally connecting the adjacent ends of successive links, said chain conveyor having a plurality of capsule receiving means, said capsule receiving means including said sleeve pins adapted to receive the body portion of a capsule and a complementary cap holder for retaining the cap portion of the capsule, means for pivotally connecting said cap holder to said chain conveyor for movement relative to an adjacent sleeve pin, means for guiding said chain conveyor along a predetermined path, means for pivoting said cap holder relative to said chain conveyor as said chain conveyor is guided along said path whereby said cap holder is moved into and out of alignment relative to its complementary sleeve pin in a predetermined sequence.

16. The invention as defined in claim 15 and including separating means operatively associated with said capsule receiving means for separating the body portion of a capsule received therein from the cap portion thereof.

17. The invention as defined in claim 15 wherein said cap holder and complementary body holder each have a bore therein for receiving the capsule, in the aligned position thereof, said cap holder having an internal shoulder defining an opening sized to retain the cap portion therein while permitting the body portion of the capsule to pass therethrough, and said body holder being sized to accommodate and carry the body portion upon separation thereof from the cap.

18. The invention as defined in claim 16 wherein said separating means include a vacuum means disposed in the path of travel of said conveyors, said body holder having an opening therein adapted to be brought into communication with said vacuum means as said conveyors pass thereover said vacuum means.

19. In a capsule filling machine having a capsule feed station and a capsule filling station, the improvement of means for successively conveying and handling a capsule having a cap portion and a body portion comprising:

an endless conveyor means, a complementary capsule receiving means carried on said conveyor means for accommodating said cap portion and body portion respectively, means for guiding said conveyor means along a predetermined path whereby the complementary capsule receiving means are disposed in alignment in passing through said capsule feeding station for receiving a capsule, means for effecting separation of said capsule portions within said complementary capsule receiving means as said capsule receiving means is directed through said capsule feed station, means for effecting misalignment of said complementary capsule receiving means upon separation of said capsule to expose the body portion of the capsule of filling, means for bringing the respective complementary capsule receiving means into alignment subsequent to the filling of the body portion of the capsule in passing through said filling station, means for effecting assembly of the filled body portion of the capsule to the cap portion thereof, and means for effecting the ejection of said filled and assembled capsule from said capsule receiving means, wherein said endless conveyor means comprises a chain having a plurality of links and sleeve pins pivotally interconnecting the adjacent links, said complementary capsule receiving means including said sleeve pins adapted to receive and support the body portion of a capsule, and an arm pivotally connected to said sleeve pins, and means carried on said arm to define a complementary capsule receiving means adapted to receive the cap portion of a capsule.

20. The invention as defined in claim 19 wherein said sleeve pins have a bore extending therethrough, and means for retaining the body portion of the capsule therein.

21. In a capsule filling machine the improvement of a flexible endless conveyor means, means for guiding said endless conveyor in an endless path, complementary capsule receiving portions carried on said conveyor means, one of said complementary capsule receiving portions being movable relative to the others, and means operating as one of said capsule receiving means for effecting relative movement thereof for bringing said complementary capsule receiving portion into superposed aligned relationship through a predetermined portion of the respective travel thereof and into misaligned relationship through another portion of said travel, wherein said conveyor means include a flexible chain comprising of a plurality of connected links, one of said complementary capsule receiving portions defining the pivotable connection between adjacent links whereby the distance between centers of adjacent link connections define the pitch of said chains, and the other of said capsule receiving portions being pivotally connected to said chain for movement into and out of alignment with said first mentioned capsule receiving portion.